(12) United States Patent
Garitaonandia Aramberri et al.

(10) Patent No.: US 10,865,077 B2
(45) Date of Patent: Dec. 15, 2020

(54) SYSTEM FOR ASSEMBLING/DISASSEMBLING WINDMILLS

(71) Applicant: SLING SUPPLY INTERNATIONAL, S.A., Oiartzun (ES)

(72) Inventors: Pedro Garitaonandia Aramberri, Oiartzun (ES); Mikel López Ruiz, Oiartzun (ES); Igor Rodríguez Aldea, Oiartzun (ES)

(73) Assignee: SLING SUPPLY INTERNATIONAL, S.A., Oiartzun (ES)

(*) Notice: Subject to any disclaimer, the term of this patent is extended or adjusted under 35 U.S.C. 154(b) by 341 days.

(21) Appl. No.: 15/567,287

(22) PCT Filed: Mar. 30, 2017

(86) PCT No.: PCT/ES2017/070187
§ 371 (c)(1),
(2) Date: Oct. 17, 2017

(87) PCT Pub. No.: WO2018/178409
PCT Pub. Date: Oct. 4, 2018

(65) Prior Publication Data
US 2018/0290864 A1    Oct. 11, 2018

(51) Int. Cl.
*B66C 23/18*  (2006.01)
*E04H 12/34*  (2006.01)
(Continued)

(52) U.S. Cl.
CPC .......... *B66C 23/185* (2013.01); *B66C 23/207* (2013.01); *E04H 12/342* (2013.01);
(Continued)

(58) Field of Classification Search
CPC ..... B66C 23/18; B66C 23/185; B66C 23/207; B66C 23/32; E04H 12/342; E04H 12/344; E04H 12/348; F03D 13/10; F03D 13/20
See application file for complete search history.

(56) References Cited

U.S. PATENT DOCUMENTS 8,584,429 B2    11/2013  Zavitz et al.
9,376,291 B2 *   6/2016  Laurens ................ B66C 23/207
(Continued)

FOREIGN PATENT DOCUMENTS

DE    19647515    5/1998
DE    19741988    4/1999
(Continued)

*Primary Examiner* — Michael R Mansen
*Assistant Examiner* — Juan J Campos, Jr.
(74) *Attorney, Agent, or Firm* — Greenblum & Bernstein, P.L.C.

(57) ABSTRACT

A system for assembling/disassembling a windmill in a supporting tower, comprising a intermediate fixing structure with hydraulic supports for attachment, by pressure, to the tower; a main structure capable of being attached to the tower at various working positions by absorbing the diametral differences of the latter; two pivoting arms hinged to the main structure and capable of being positioned by hydraulic actuators; a secondary structure for hoisting tower segments, equipped with four cranes of a minor size for handling the main structure and the pivoting arms during hoisting/descent, and a counterbalancing group adjustable in height by means of capstans. The main structure and the intermediate structure include a detachable side for their withdrawal and separation from the tower during disassembly.

9 Claims, 9 Drawing Sheets

(51) Int. Cl.
 *F03D 13/10* (2016.01)
 *B66C 23/20* (2006.01)
(52) U.S. Cl.
 CPC ........... *E04H 12/348* (2013.01); *F03D 13/10* (2016.05); *F05B 2230/60* (2013.01); *F05B 2230/61* (2013.01); *F05B 2230/70* (2013.01); *F05B 2230/80* (2013.01); *F05B 2240/912* (2013.01); *F05B 2240/916* (2013.01); *Y02E 10/728* (2013.01); *Y02P 70/50* (2015.11)

(56) References Cited

U.S. PATENT DOCUMENTS

| | | | |
|---|---|---|---|
| 10,494,235 B2 * | 12/2019 | Nelson | B66C 23/207 |
| 2003/0183594 A1 * | 10/2003 | Torres Martinez | B66C 23/32 |
| | | | 212/196 |
| 2009/0282776 A1 | 11/2009 | Berg | |
| 2011/0067353 A1 | 3/2011 | Tadayon | |
| 2015/0048043 A1 * | 2/2015 | Laurens | B66C 23/207 |
| | | | 212/179 |

FOREIGN PATENT DOCUMENTS

| | | | | |
|---|---|---|---|---|
| EP | 1857670 A1 * | 11/2007 | | B66C 23/32 |
| EP | 2746571 | 6/2014 | | |
| JP | 11082285 A * | 3/1999 | | B66C 23/207 |
| WO | 2010/136026 | 12/2010 | | |

* cited by examiner

SYSTEM FOR ASSEMBLING/DISASSEMBLING WINDMILLS

OBJECT OF THE INVENTION

The present invention refers to a system for assembling/disassembling windmills that offers essential characteristics as far as novelty is concerned besides of remarkable advantages with respect to the means known and used for the same purposes in the current state of the art.

More particularly, the invention proposes the development of a system whereby the assembly and disassembly operations of tower segments, nacelle and full rotor making up the windmills can be carried out in a much easier and quicker manner in comparison to the traditional systems, without having to move huge cranes to the place of installation, and therefore in a much more economical manner than in said traditional systems.

To such purposes, the system of the invention includes a number of devices that provide a guided movement along the supporting tower, elements for friction fixing to the various tower segments, and systems for handling the different loads with a total protection as far as the integrity of all elements of the windmill is concerned.

The application field of the invention is included within the industrial sector dedicated to the construction and installation of windmills to take advantage of the wind energy and its eventual conversion to electric energy.

BACKGROUND OF THE INVENTION

The evolution of the industry of energy generation from renewable sources and in particular from wind energy is in an upward progression in both installed capacity and the technology itself. The growing demand for machines with a higher generation capacity and also the availability of sites with lower-quality wind, urges the windmill designers to increase the size of both the tower and the rotor of its machines.

This entails an increase in the assembly height and in the maximum work load that the cranes for windmill assembly must withstand. Currently, these cranes already imply a great cost for the installation companies for wind turbines, both by the high operational costs (they also imply a cost when the environmental conditions do not allow to work), and by the high transportation costs. They also imply a real concern due to their scarcity and therefore to availability problems. All these problems of cost and availability are supposed to be growing as cranes with greater height and work load are required.

These shortcomings and requirements of the current technology lead to feeling the need for designing a system including structures and mechanisms that are capable of performing the main crane manoeuvres, but with a much lower operating cost. It is also necessary to reduce the downtime cost, for example when the weather conditions do not allow to use the crane.

There are many types of designs relating to the solution of this problem. Specifically, the industry presents three types of general solutions to this particular problem: a lifting structure capable of modifying its position along the tower (see, for example, EP 2746571 A2, US 2009/0282776 A1, US 2011/0067353 A1, among others), a structure capable of lifting the windmill as it inserts tower segments at the bottom, and devices that behave as a crane but with lower operating cost (see, for example, U.S. Pat. No. 8,584,429 B2). All these proposals solve the windmill assembly but suffer from problems which are intrinsic to their design which in turn cause the solution to be insufficient. These problems in the current state of the art are summarized in the following 5:

1. Disproportionate size of structure (high cost of transportation)
2. It requires modifications to the product (windmill)
3. Auxiliary structure of hoist (complexity of assembly and guidance)
4. Stresses unable to be withstood by the tower (inappropriate design)
5. Auxiliary equipment for the rotation of the tower (extra cost of operation)

Therefore, there is a real need in the current state of the art for solutions enabling to effectively solve the current problems associated with the assembly of windmills without creating other problems of equal or similar magnitude to those already existing. The ideal case is simplifying and reducing all costs related to the transportation, assembly and disassembly of the means required for the installation or removal of windmills. Also, it would be equally advantageous to be able to have an equipment for the maintenance of big corrective actions of the windmill, which is simple to build, as well as more easy, faster and more economical to install and use compared with means of the current technology, while enabling to perform all operations in a totally safe manner both for the elements that are handled (i.e. all components of the windmills) and for the staff involved in all the operations.

SUMMARY OF THE INVENTION

These objectives have been fully achieved through a system that will be described here-below and which essential features have been detailed under the claims accompanying the present description.

Thus, a first object of the invention consists in providing an ascending/descending system of all the components of a windmill for the purpose of assembling/disassembling the latter, wherein the elements that are part of the equipment for the practical materialization of the system have been designed in such a way that permit an easy transportation up to the place of installation, inside three or four containers carried in three or four respective trucks. As an only auxiliary element the installation means are intended to include a truck-crane of a conventional kind besides the resources usually available in a wind turbine fields.

A second object of the invention consists in developing and creating an equipment capable of ascending/descending along the tower of the windmill, in a totally safe manner.

In order to achieve both objects, the system of the invention for assembling/disassembling windmills has considered the creation of equipment made of:

A intermediate fixing structure equipped with supports in hydraulic arms circumferentially arranged on the main structure and on the secondary structure used to generate a compression stress on the various tower segments so as to join the bodies by means of friction.

A main structure, capable of being rigidly attached to the tower in their different working positions by absorbing the difference in diameter that could exist from one to another; and providing a load holding element during the ascent/descent operations of the various elements that make up the windmill.

A set of two pivoting arms attached by hinges to the main structure, which together with a group of pulleys and a pair of capstans provide two symmetrical hoisting hooks.

A secondary structure, capable of being fixed to the various tower segments and providing a hoisting point for the latter in a section below its top flange.

Group of four minor size, electrically operated cranes, arranged in the secondary structure which are used for handling the set consisting of the main structure and the pivoting arms during the hoisting/descent manoeuvres along the length of the windmill tower to place the equipment in the different working positions.

Counterbalancing equipment, adjustable in height by means of capstans, anchored to the foundation or held by counterweights, that generate an stress on the main structure to avoid the transmission of bending stress on the windmill tower.

As it will be understood, an equipment designed as set forth in the foregoing, intended for operations of hoisting/descent of all the components of a windmill during the assembly/disassembly operations of the latter, greatly simplifies all operations related to the transportation and use of the components, with the consequent saving of time, labour and, above all, transportation and operation expenses compared with the systems of the current technology used for the same purposes.

BRIEF DESCRIPTION OF DRAWINGS

These and other features and advantages of the invention will be made clear from the following detailed description of a preferred embodiment thereof, given only by way of illustrative example and without any limitation purpose with reference to the accompanying drawings, wherein.

DETAILED DESCRIPTION OF AN EMBODIMENT

Figure 1:
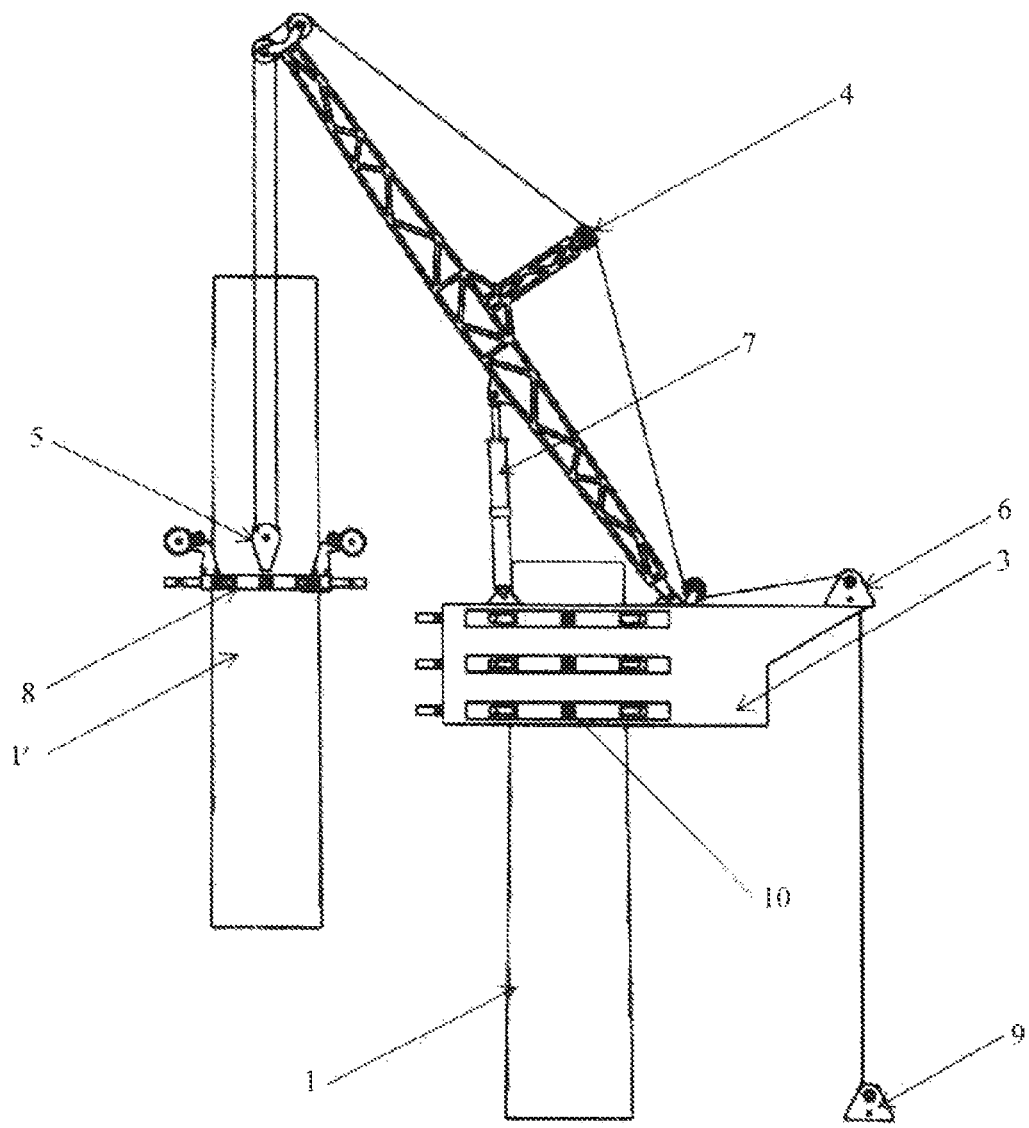
FIG. 1 shows a basic schematic elevational representation, illustrative of the system of the present invention.

As mentioned above, the detailed description of the preferred embodiment of the object of the invention, is to be performed in what follows with the help of the attached drawings, throughout which the same reference numerals are used to designate the same or similar parts. Thus, attending first to the representation of FIG. 1, a schematic view of a particular case of application and use of an embodiment example of the system of the present invention can be seen. In particular, the representation shows a tower 1 of a generally frustoconical shape, on which the main structure 3 is fixed. The main structure 3 consists of a set of pressure arms 10, whose mission is to generate pressure on the tower so that the main structure 3 is mechanically attached to the tower segment 1. It is thus possible to complete the structure of a generic crane using the tower segment 1 as a pillar of the crane, the arms 4, from which the hooks 5 are suspended. A pair of symmetrical capstans 6 which through a pulley system through the arm 4 are capable of generating the movement for hoisting and lowering the hooks 5 is used to perform all the movements required for the simulation of a crane. In addition, the hydraulic cylinders 7 are used to move the arms 4. As shown in FIG. 1, the tower segment 1' to be placed on the tower segment 1 already installed, is handled through the intermediate fixing structure 8. This structure, schematically visible in the representation in FIG. 2, has a multiplicity of pressure arms 10, with inner supports 11, similar to those in the main structure 3, enabling it to mechanically hold the tower segment 1' to be installed from a point above the centre of gravity thereof, but below the usual hoisting point, which would be the top flange of the segment, achieving a considerable reduction of the height required for its installation. As mentioned above, the bending stresses on the already installed tower 1 transmitted through arms with supports 10 which generate pressure, are very restrictive when it comes to perform manoeuvres with an equipment as just described, whereby an active counterbalancing group 9 is installed, fixed to the ground and generating a load on the side opposite to that of the handled load eliminating or reducing the bending stress on the tower 1 to permissible levels. The system of the invention comprises sufficient equipment for complete handling of the set of segments that make up the tower to be installed, for both the rotation and the vertical hoisting, as well as of the remaining elements that make up the wind turbine (nacelle and full rotor).

Figure 2:
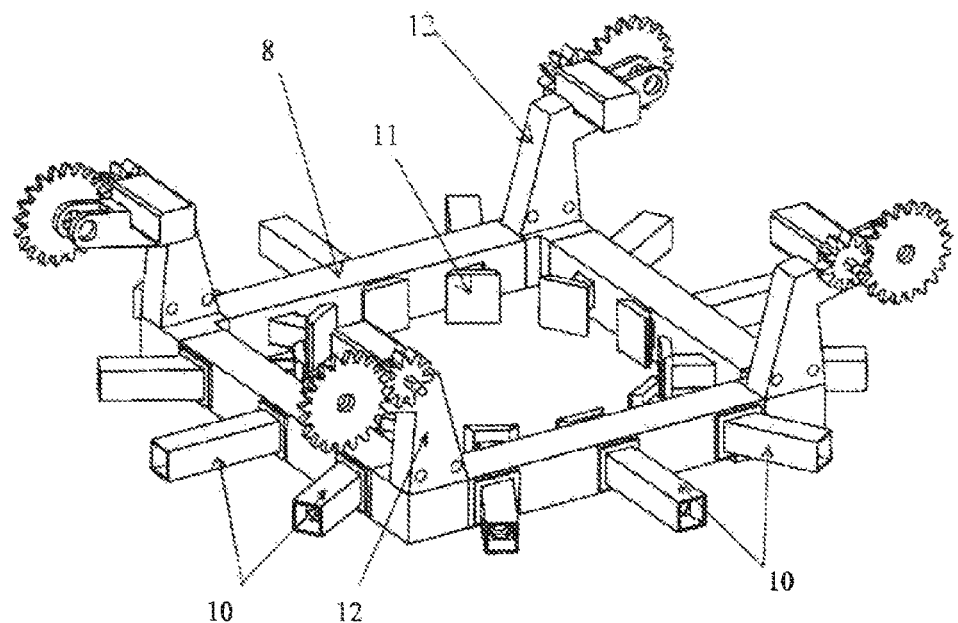
FIG. 2 shows a schematic perspective representation of the intermediate fixing structure.
Figure 3A:
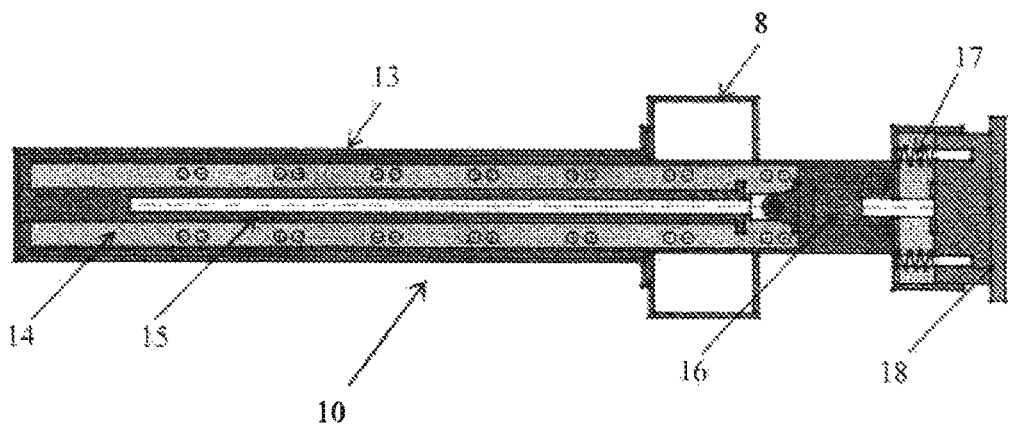
FIG. 3a shows a schematic representation, in a cross-sectional elevational view, of a tower-supported hydraulic mechanism.
Figure 3:
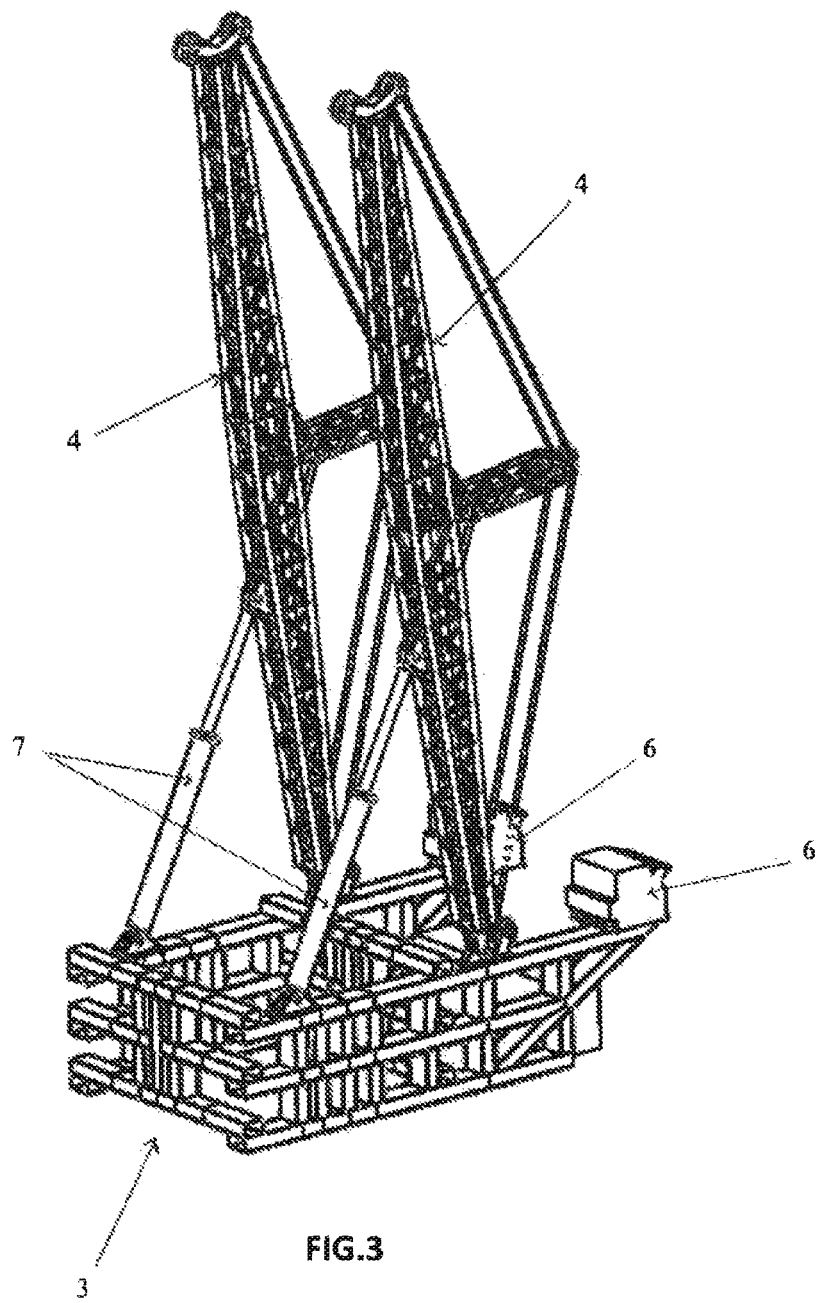
FIG. 3 shows a schematic perspective representation of the main structure.

Included in the equipment required for the complete assembly of a turbine, the system of the invention has provided minor size, electrically operated cranes 12, arranged in the intermediate fixing structure 8 as shown in FIG. 2. Similar to the intermediate fixing structure being handled through the hooks 5 of main structure 3, the main structure 3 itself is handled by means of the cranes 12. As already mentioned, the supports 11 of the intermediate fixing structure 8 rest on the tower segments 1' during handling, but they are also used for self-hoisting of the main structure 3, as a supporting point. The composition of these arms 10 with supports 11 can be seen in detail in FIG. 3a. The whole mechanism and elements of the support 11 are fixed to the intermediate structure 8 and also to the main structure 3. The inclusion of a protecting metal cover 13 is provided to prevent that any contact can generate damage to the mechanism for driving the support 11. Within this network of structures an arm 14 is introduced which is made of metal tube. This tube will have different working positions according to the diameter of the tower segment 1' to which the intermediate structure 8 must be fixed. A hydraulic actuator 15 is provided to place this arm 14 in each of the positions. Then, by using another hydraulic actuator (not visible in the figure), a pair of bolts (not visible in the figure either) are introduced to block the arm in the working position. At this time a second hydraulic actuator 16 of the support 11 is actuated, this hydraulic actuator 16 being responsible for generating pressure on the wall of the tower by means of contact between the tower and a rubber plate 18 pushed by said second hydraulic actuator 16. In load position, springs 17 arranged within each arm 10 against the respective support 11, are preloaded. In this way, should by any reason the hydraulic power be lost, the supports 11 will continue to maintain the pressure on the tower segment 1' and both elements will therefore continue to be fixed elements by friction.

One the main elements that are part of the system of the invention are known, the process required for the installation of a complete turbine by using the system of the invention will be discussed.

Figure 9:
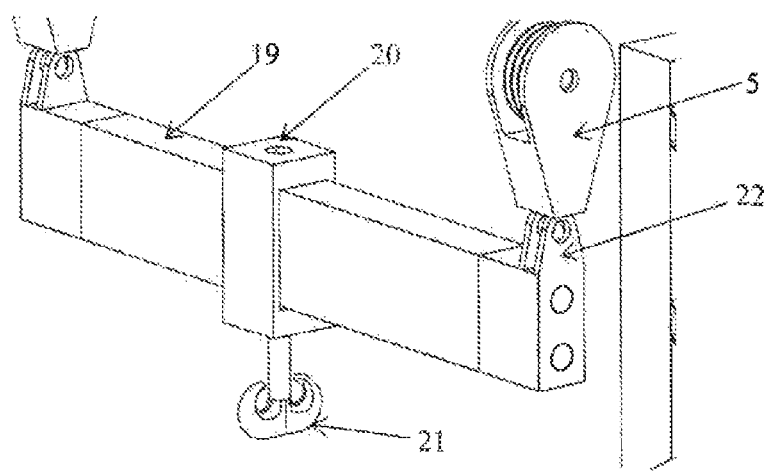
FIG. 9 shows a schematic perspective representation of the rocker arm used for handling load from a single point.

The first step is to install the main structure 3 around the gap where the tower segment 1 will be placed. The tower segment arrives in a horizontal position on a truck. An auxiliary beam 19 (see FIG. 9) is placed suspended from the hooks 5 of the arms 4 of the main structure 3. This beam 19 has an anchor hook 21 which is mounted on a hook body 20 enabling, with the help of hydraulic and electric means, the translation along the beam 19 and the rotation of the hook 21. Thus the main structure 3 has all movements required for adjusting the position of the loads to be raised. The usual pole segment hoisting elements are installed on the hook 21 and by using an auxiliary crane the rotation of the segment is performed in an ordinary manner until it is in upright position. With the first pole segment 1 in upright position, the equipment for retention by auxiliary crane is removed and is placed on the fixing surface. The segment is fixed in position and is released from the auxiliary beam 19. The auxiliary beam 19 rests on its supports on the ground and is released from the hooks 5. The intermediate fixing structure 8 is tied with the hooks 5 and is placed in the segment 1. By applying pressure with the supports 11 of the pressure arms 10, intermediate fixing structure 8 is fixed to the tower segment 1 already installed. By making use of the cranes 12 the main structure 3 is lifted to its working position in the tower segment 1 already installed. Again pressure is applied on the supports 11 of the pressure arms 10 included in the main structure 3, fixing the latter to the already installed tower segment. The hooks 5 are again fixed to the intermediate fixing structure 8 and it is released from the segment and placed on the ground. With the arrival in a horizontal position of the next tower segment, the auxiliary beam 19 is again placed in the hooks 5 for rotation of the new tower segment. As the segments subsequent to the first one are longer than the arms 4 of the main structure 3, it is necessary to place the intermediate fixing structure 8 for the hoisting of this segment. Before performing this operation, as the rotation of the tower will be prevented by the hoisting method, it is necessary to preset the tower segment in a position exactly equal to the placement position. To that end, while hanging from the hook 21, it is rotated and positioned on the ground in a structure with guiding elements that is on the ground. Thus the tower segment is always handled in assembling position. The intermediate fixing structure 8 is placed on the tower segment to be installed and is lifted to its position for attachment with the already installed segment. Once it has been firmly attached to the previous tower segment, the main structure 3 is hoisted following the same procedure described above. Once the main structure 3 is in the working position, the intermediate fixing structure is removed and placed on the ground. This same procedure is used until all the segments that make up the tower of the wind turbine have been installed.

Figure 7:
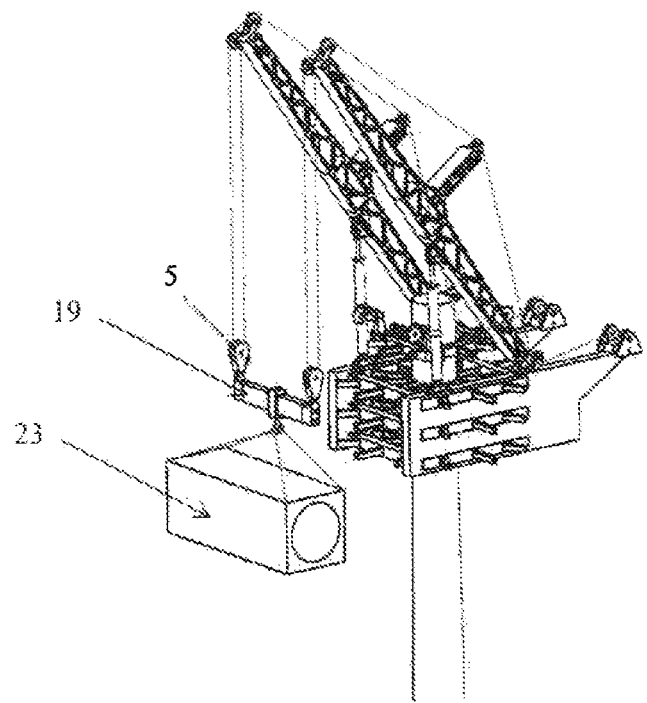
FIG. 7 shows a schematic perspective representation of the equipment required for handling the nacelle.
Figure 8:
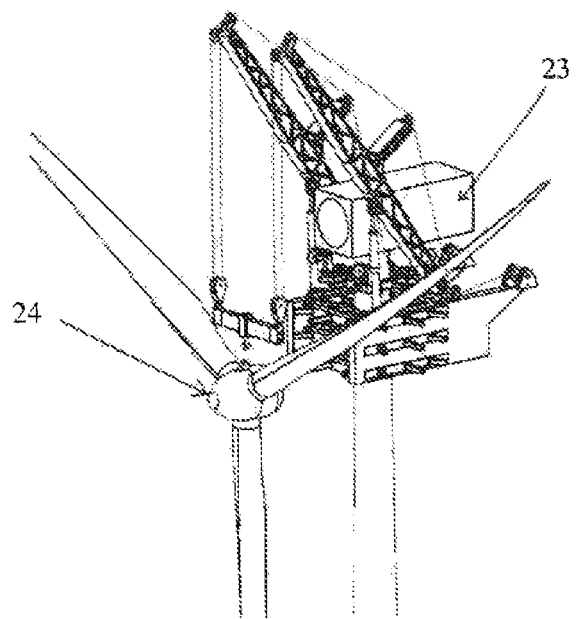
FIG. 8 shows a schematic perspective representation of the equipment required for handling the full rotor.

With the last tower segment installed, the intermediate fixing structure 8 is maintained in position. That is, at this point it is not necessary to remove it from the tower segment. The auxiliary beam 19 is again connected to the hooks 5. Using conventional lifting equipment and elements, the nacelle 23 of the turbine is hoisted with the help of the hook 21 of the auxiliary beam 19. FIG. 7 shows a method of hoisting nacelle 23 by means of the system of the invention. Using the hydraulic cylinders 7 and the positioning (rotation and translation) system of the hook 21 the flange of the nacelle is perfectly positioned on the tower flange. Similarly to the nacelle 23 being installed the hook 21 of the auxiliary beam 19 is used as a hoisting point for the full manoeuvre for assembling the full rotor 24.

Figure 4:
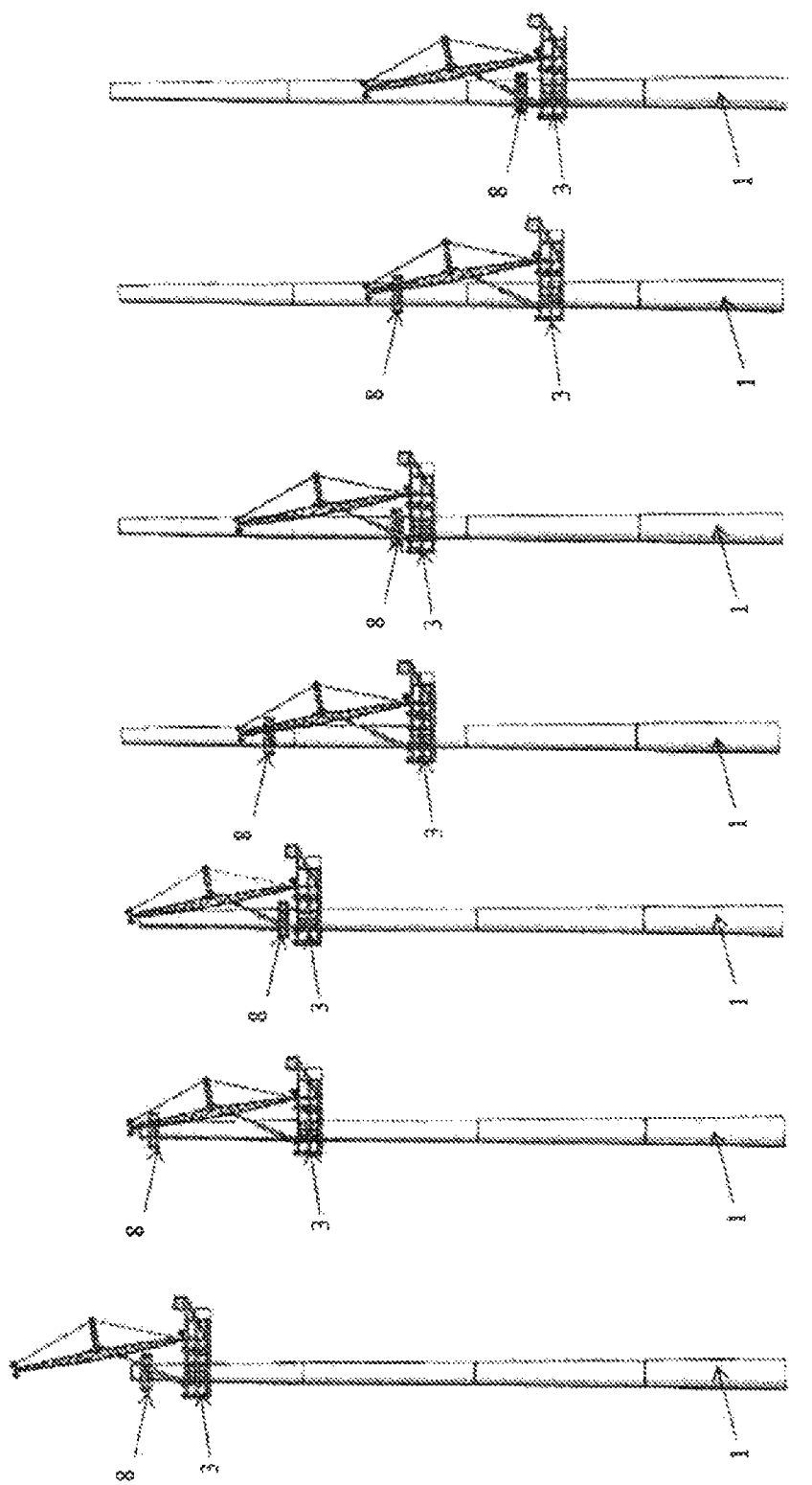
FIG. 4 shows a schematic elevational representation of a sequence of moving manoeuvres of the intermediate fixing structure and the main structure along a tower.

With these manoeuvres the turbine is fully assembled, but it is necessary to perform the manoeuvres to remove both the main structure 3 and the intermediate fixing structure 8 from turbine tower. The various steps required to lower both structures over the tower down to the lowest part can be seen in FIG. 4. The descent of the main structure 3 is made with the cranes 12 of the intermediate fixing structure 8 and the intermediate fixing structure 8 is lowered with the hooks 5 of the main structure 3. As it is not possible to make the descent in a single manoeuvre, it is necessary to perform as many operations as necessary depending on the final length of the turbine tower.

Figure 5:
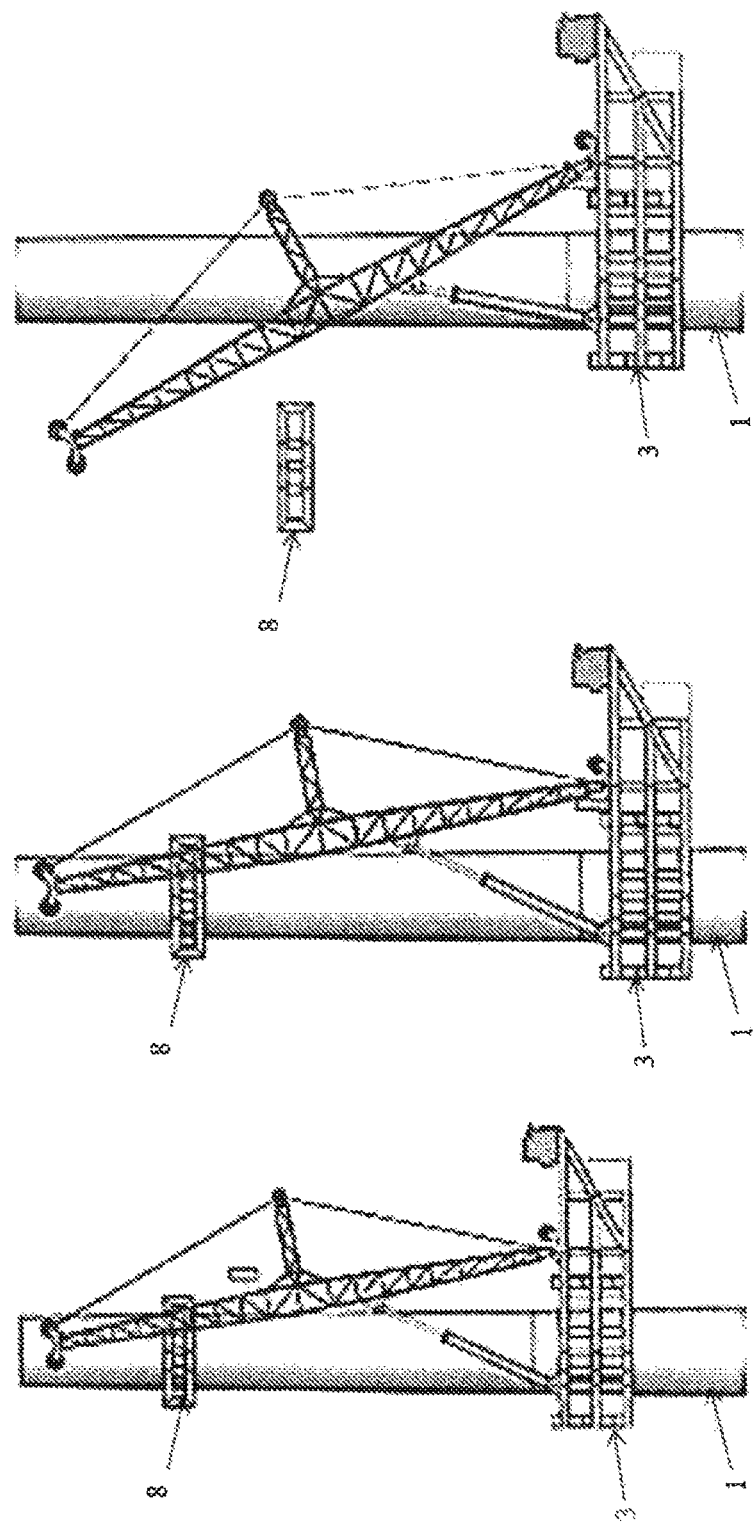
FIG. 5 shows a schematic elevational representation of the sequence of manoeuvres needed to remove the intermediate fixing structure.

The disassembly of the intermediate fixing structure 8 is performed as shown in FIG. 5. By using their own cranes 12 a part of the intermediate fixing structure is removed, leaving a C-shaped structure open on one side, which allows to remove, by means of the hooks 5 of the main structure 3, the intermediate fixing structure from the tower and to place it on the ground.

Figure 6A:
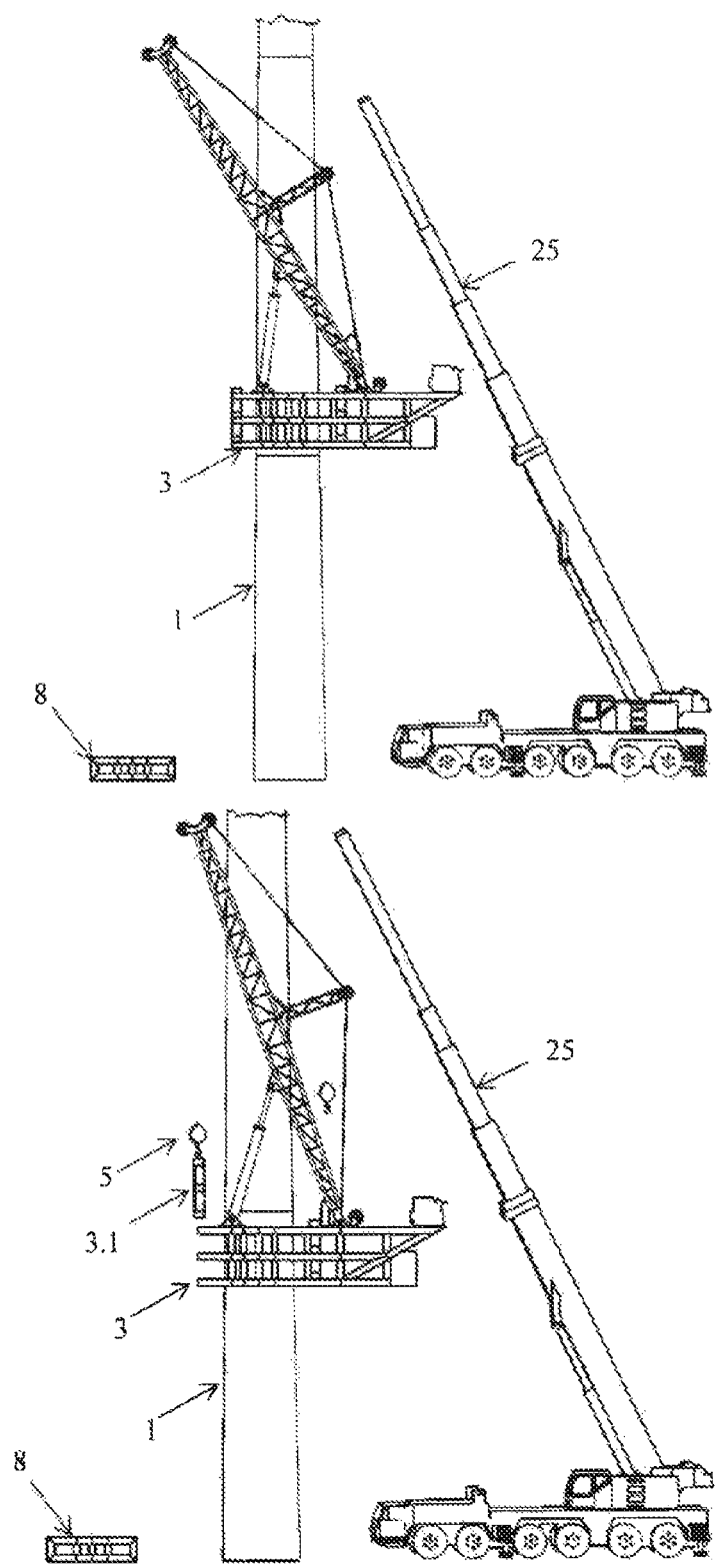
FIGS. 6a and 6b show a schematic elevational representation of a series of manoeuvres of the same sequence, required for the removal of the main structure.
Figure 6B:
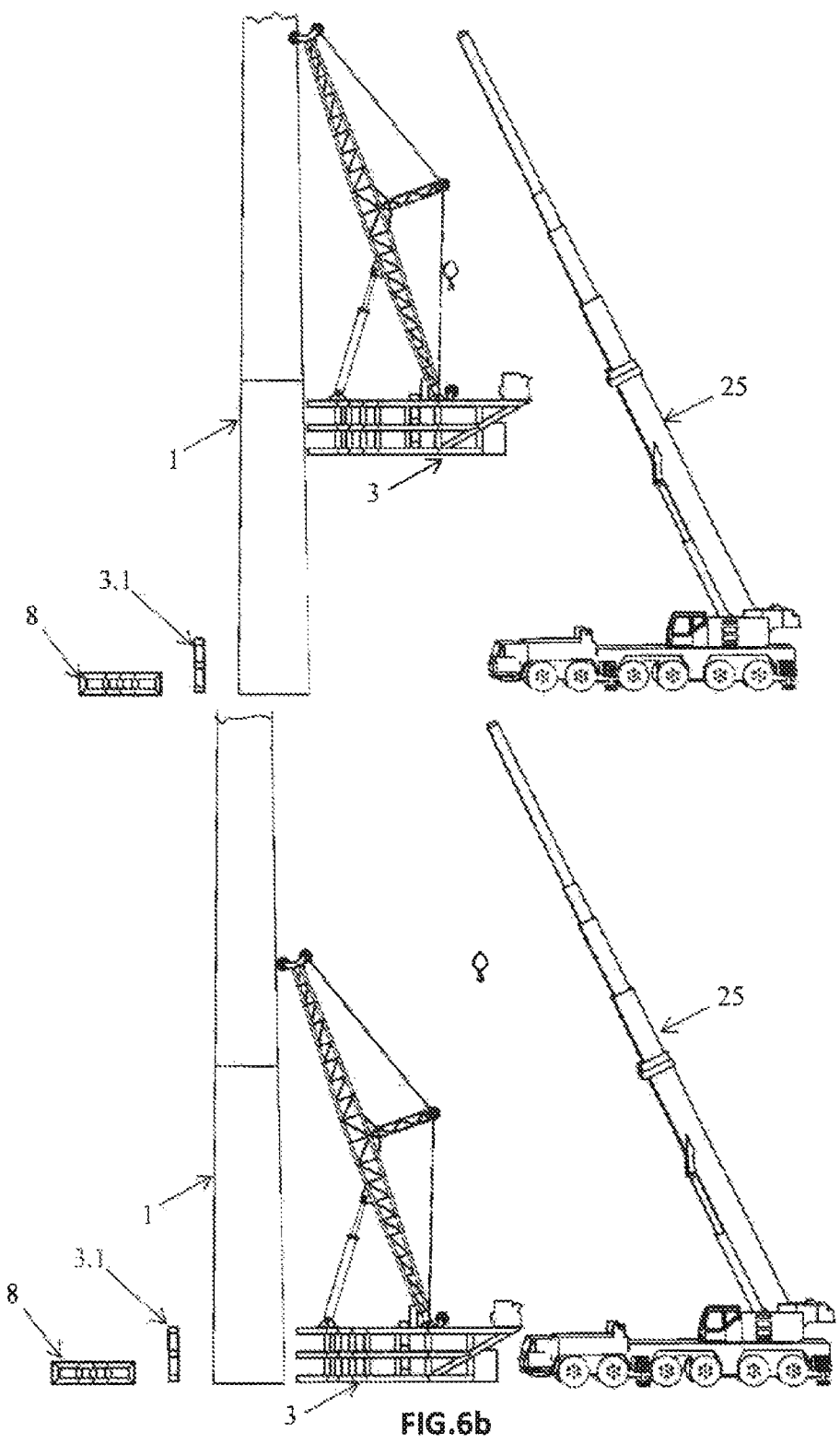

Thus, now it only remains to disassemble the main structure. There are two possibilities to perform the disassembly. As discussed at the beginning, depending on whether the first tower segment has a minimum diameter greater than the maximum working diameter of the main structure 3, it will be required to perform an additional operation or not. If the main structure 3 can be lowered down to the ground without any opposition from the tower, disassembly is performed on the ground. However, when it is not possible to bring the main structure 3 to the ground due to geometric reasons, it will be required to perform the steps that are depicted in the sequence shown in FIGS. 6a and 6b. By means of an auxiliary crane 25 the main structure 3 is held at the centre of gravity. By using the hooks 5 themselves one of the front portions of the main structure 3 is removed and carried to the ground. With the front portion removed, it is possible to take the main structure 3 out of the tower by means of the auxiliary crane 25.

Although the assembly of wind turbines has been mentioned as the primary mode of use, this equipment can also be used for the big corrective operations, from the change of the generator to the change of the multiplier or the replacement of blades or the substitution of bearings.

Making the content of this description any longer is deemed unnecessary for a skilled person in the matter to understand its scope and the resulting advantages in order to make a practical realization of the invention.

Notwithstanding the above, and since the description made corresponds only to an example of a preferred embodiment of the invention, it may be perfectly understood that within its essentials, multiple variations may be introduced, also protected, which may affect the shape, the size or the materials of fabrication of the whole or any of its parts, without that implying any alteration of the invention, which is only restricted by the claims provided below.

The invention claimed is:

1. A system for assembling/disassembling windmills including constructive components that include a tower, a nacelle and a rotor, comprising:
   a main structure, having one hoisting point or two hoisting points at different heights, being configured to be coupled at different working positions to a tower of a windmill, which is one of under construction or constructed, as a holding pillar
   four electrically operated cranes for hoisting or lowering the main structure in an ascent or descent operation along the tower, wherein, in hoisting or lowering the main structure, a geometry of the main structure is varied to avoid collision with the constructive components;
   wherein the main structure is further configured as a load holding element movably attachable to a tower segment at a beginning of tower construction, at an end of the tower construction and during the ascent or descent operation between the beginning and end of the tower construction,
   arms being coupled to the main structure to generate pressure to transmit stresses to the tower, wherein the arms have a structure that is adjustable via a hydraulic system of hydraulic actuators and hydraulic cylinders to generate working pressures against the tower to accommodate different diameters of the tower during the ascent or descent operation along the tower, wherein springs are arranged to maintain the working pressure in an event of a failure of the hydraulic system;
   an intermediate fixing structure, which is configured for fixable attachment to another tower segment, comprises a plurality of pressure arms positionable at a handling point located below a top of the another tower segment and above a center of gravity of the another tower segment;
   two pivoting arms coupled to the main structure having a pulley system and two hooks;
   an auxiliary beam, having an anchor hook for connecting to the constructive component of the windmill, connectable to the two hooks of the two pivoting arms, wherein translational and rotational movement is imparted to the anchor hook to adjust and position the connected constructive component,
   wherein, while on the ground, correct positions for tower segments are indicated before being attached to the intermediate fixing structure so the tower segments are placed, without rotation, on the tower under construction.

2. The system according to claim 1, wherein the main structure includes a set of two wires integrally attached to a lower part of the windmill and to capstans allowing the main structure to handle loads without transferring bending stresses to the tower.

3. The system according to claim 1, wherein each of the capstans is either anchored in the ground or is locked in position by counterweights.

4. The system according to claim 1, wherein each of the two arms is linked to the main structure by hydraulically actuated mechanical elements allowing for rotation of each arm to modify a position of the two hooks.

5. The system according to claim 1, wherein the main structure includes capstans rigidly attached to a rear portion of the main structure, so that, via the pulley system, loads are transmitted from the rear portion of the main structure to the two hooks.

6. The system according to the claim 1, wherein the intermediate fixing structure comprises a frame with a removable side and wherein for disassembling the intermediate fixing structure from the tower, the removable side is removed from the frame.

7. The system according to the claim 1, wherein the main structure comprises a frame with a removable side and wherein for disassembling the main structure from the tower, the removable side is removed from the frame.

8. The system according to claim 1, wherein the plurality of pressure arms of the intermediate fixing structure fixably attach the intermediate fixing structure to the different tower segment to reduce a crane height required for installation to a minimum.

9. A method of using the system according to claim 1 to at least one of assemble or disassemble a windmill, comprising:
   sequentially moving the main structure and the intermediate fixing structure along a length of a tower,
   whereby the main structure and the intermediate fixing structure are placed at any working position for installation, repair or maintenance of the windmill.

* * * * *